United States Patent Office 3,737,491
Patented June 5, 1973

---

3,737,491
CATALYSTS
Cornelius Marthinus Stander, Kempton Park, Transvaal, and David Owen Hughes, Boksburg, Transvaal, Republic of South Africa, assignors to African Explosives and Chemical Industries Limited, Johannesburg, Transvaal, Republic of South Africa
No Drawing. Filed Dec. 9, 1970, Ser. No. 96,577
Claims priority, application Republic of South Africa, Dec. 12, 1969, 69/8,640, 69/8,641
Int. Cl. B29h 7/20
U.S. Cl. 264—43          7 Claims

ABSTRACT OF THE DISCLOSURE

Catalyst supports comprising porous, shaped refractory bodies are made by heating a mixture of constituents of which at least one is selected from the nitrate, oxide or hydroxide of aluminum and the dioxide of titanium and at least one is selected from the nitrates of alkaline earth metals to a first elevated temperature sufficient to produce a binding agent within the mixture, comminuting the resulting material, shaping the material into bodies and heating the shaped bodies at a second elevated temperature for a period of time sufficient to complete the reactions between the constituents to produce bodies of adequate mechanical strength to be self supporting.

---

The present invention relates to the manufacture of porous, shaped, refractory bodies.

It is known that porous, refractory bodies, such as those used as carriers for catalysts, may be made by sintering a mixture of lime (CaO) and alumina ($Al_2O_3$) at a temperature of about 1,600° C. This method is costly because of the high temperatures involved and the difficulties in sintering the refractory bodies or casting the molten refractory material. It is also known that hydraulic cements may be used as or incorporated in catalyst carrier compositions to enable the carrier to be formed at low temperatures. However, one of the requirements of a catalyst carrier and of refractory bodies in general, is that they should have adequate strength and be self supporting at the temperatures and loads to which they are subjected during use. The carriers comprising or containing hydraulic cements have been found to lose strength at about 600° C. As the temperatures at which many important reactions take place are in excess of 600° C. this is a serious disadvantage for which no convenient remedy is known.

It is known that the aluminates and titanates of certain alkaline earth metals, for example, calcium aluminate, are suitable carriers for active metal or metal oxide catalysts and that they are thermodynamically stable in the presence of the catalyst at the temperature of the catalytic reaction, which temperature may be about 1,000° C.

The aluminates and titanates of the alkaline earth metals are useful as refractory materials in applications other than as catalyst supports. They may be used, for example, as packing rings in packed towers which are used in the chemical industry. Hitherto, these aluminates and titanates have been produced by the sintering process referred to above, in which temperatures of about 1,600° C. are used.

It is an object of the present invention to provide shaped refractory bodies having adequate strength and suitable for use in industrial processes.

According to the present invention there is provided a process for making porous, shaped refractory bodies comprising heating a mixture of constituents of which at least one is selected from the nitrate, oxide or hydroxide of aluminium and the dioxide of titanium and at least one is selected from the nitrates of alkaline earth metals to a first elevated temperature sufficient to produce a binding agent within the mixture, comminuting the resulting material, shaping the material into bodies and heating the shaped bodies at a second elevated temperature for a period of time sufficient to complete the reactions between the constituents to produce bodies of adequate mechanical strength to be self supporting.

The first heating stage of the process of the invention may be eliminated by selecting a mixture of constituents comprising an oxide or hydroxide of aluminium or the dioxide of titanium and a substantially anhydrous nitrate of an alkaline earth metal, which mixture is shaped into shaped bodies which are then heated at an elevated temperature within the range of the second elevated temperature referred to above.

The nitrates of the alkaline earth metals used in the process may be the nitrates of calcium, barium, strontium and magnesium.

The preferred proportions of the mixture of constituents selected from (i) the nitrate, oxide or hydroxide of aluminium and the dioxide of titanium and (ii) the nitrates of the alkaline earth metals are approximately stoichiometric, the quantities being chosen to ensure that the molar ratio of the constituents selected from (i) and (ii) above in the product of the invention is about 1:1. A slight excess of the oxide of alkaline earth metal in the product is permissible.

The mixture of constituents is heated to a first elevated temperature at which temperature the nitrate of aluminium is converted to hydrated aluminium and the nitrates of the alkaline earth metals are obtained in substantially anhydrous form.

The first elevated temperature shall not exceed the temperature at which the nitrates of the alkaline earth metals react appreciably with the hydrated aluminium oxide or titanium dioxide and which is above about 500° C. The preferred temperature may be within the range 200–560° C. and preferably from 250° C. to 300° C.

A typical example of the reactions taking place at the first elevated temperature may be represented as follows:

$$4Al(NO_3)_3 \cdot 9H_2O \rightarrow 2Al_2O_3 + 12NO_2 + 3O_2 + 36H_2O$$

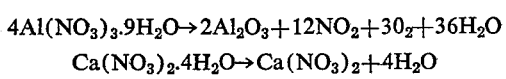

$$Ca(NO_3)_2 \cdot 4H_2O \rightarrow Ca(NO_3)_2 + 4H_2O$$

The resulting material has a slightly sticky consistency caused by the presence of the substantially anhydrous alkaline earth metal nitrate which acts as a binder for the other ingredients of the material in the preparation of the shaped bodies.

The preparation of the shaped bodies may be done by means of commonly known methods and apparatus such as, for instance, pelleting, tabletting or extrusion.

The shaped bodies are then heated to a second elevated temperature, at which temperature the alkaline earth metal nitrate and aluminium oxide or titanium dioxide react to form the corresponding aluminates or titanates and typical reactions may be represented in the example referred to above as follows:

$$2Ca(NO_3)_2 \rightarrow 2CaO + 4NO + 3O_2$$

$$CaO + Al_2O_3 \rightarrow CaAl_2O_4$$

The preferred temperature in this stage of the process is within the range 650° to 950° C.

The strength of the shaped bodies may be enhanced by treatment of the comminuted material with water either prior to the preparation of the shaped bodies or after heating at the second elevated temperature. It may be desirable to heat the shaped bodies for a further period of time at the second elevated temperature.

The porous, shaped bodies obtained from the process of the invention have adequate mechanical strength for use in many applications in the chemical and related industries. The bodies consist of aluminates or titanates of the alkaline earth metals or a mixture thereof.

They may be used as carriers or supports for catalysts which may be applied by means of commonly known methods such, for instance, impregnating or spraying with a solution or suspension of catalyst material or a percursor thereof, dusting with a catalyst or precursor thereof in particulate or powder form or rolling the shaped bodies in such powdered catalyst material. Depending on the nature and form of the catalyst material or precursor thereof and on the form in which the catalyst is required finally, the bodies, after treatment with the solution, suspension or powder, may be heated to such a temperature and under such conditions (for instance, in a reducing atmosphere) as may be necessary to convert the catalyst material or precursor thereof into the active form of the catalyst.

The shaped bodies may be used, without addition of other material, as packing bodies of any desired shape in packed towers which are used in the chemical industry.

Other uses for the shaped bodies of the invention are, for example, filters for very fine particles and diffusion membranes in chemical and electro-chemical processes. The uses to which the shaped bodies may be put are not, however, limited to the examples given above.

The invention is further illustrated by the following examples without being restricted thereto.

EXAMPLE 1

Refractory bodies were prepared by making an aqueous slurry comprising 410.4 g. barium nitrate $(Ba(NO_3)_2)$ and 1177.9 g. aluminium nitrate $(Al(NO_3)_3.9H_2O)$.

The slurry was heated to remove the water substantially and then maintained at 270° for 18 hours.

The resultant material was crushed and passed through a 65 mesh British Standard Sieve.

The powdered material was pressed into rings of 16.5 x 16.5 mm. external dimensions. The rings were heated at 700° C. for 12 hours. The rings obtained were of adequate mechanical strength.

EXAMPLE 2

Refractory bodies were prepared using the same procedure as described in Example 1. The starting materials in this example were 360 g. magnesium nitrate $$(Mg(NO_3)_2.6H_2O)$$

and 1054 g. aluminium nitrate $(Al(NO_3)_3.9H_2O)$. The rings obtained were of adequate mechanical strength.

EXAMPLE 3

Further refractory bodies were prepared using the procedure of Example 1 with the following starting materials:

159.8 g. titanium dioxide $(TiO_2)$ and
522.8 g. barium nitrate $(Ba(NO_3)_2)$

The rings obtained were strong and X-ray analyses showed that the compounds were completely converted to barium titanate.

EXAMPLE 4

Refractory bodies comprising calcium titanate were prepared following the procedure of Example 1 and using the following starting materials:

79.9 g. titanium dioxide $(TiO_2)$ and
236.2 g. calcium nitrate $(Ca(NO_3)_2.4H_2O)$ The rings obtained were strong.

EXAMPLE 5

A nickel oxide catalyst was prepared by impregnating some of the shaped rings of Example 3, before heating at 700° C., with a nickel nitrate $(Ni(NO_3)_2)$ solution. The impregnated rings were then heated at 700° C. for 12 hours. Analyses showed that the rings contained 5.22% nickel oxide.

Advantages residing in the process and product of the invention are that (a) The refractory bodies produced are porous.

(b) The porous, shaped bodies have high mechanical strength and resistance to thermal shock and do not lose strength at the high temperatures to which they may be subjected in use.

(c) The bodies are formed at low temperatures compared with those made by the sintering process and considerable saving in cost is achieved thereby.

What is claimed is:

1. Process for making porous, shaped refractory bodies consisting essentially of alkaline earth metal aluminate or alkaline earth metal titanate comprising the steps of heating a mixture in approximately stoichiometric amounts so that the molar ratio in the product is about 1:1 of hydrated alkaline earth metal nitrate, and a compound selected from the group consisting of aluminum nitrate, aluminum oxide, aluminum hydroxide and titanium dioxide at a temperature within the range of from 200° C. to 560° C., for a period of time sufficient to form anhydrous alkaline earth metal nitrate which acts as a binding agent for the resulting material, comminuting said resulting material to particles passing 65 mesh British Standard Sieve, shaping the material into bodies and heating the shaped bodies at a temperature within the range of from 650° C. to 950° C. for a period of time sufficient to complete the formation of alkaline earth metal aluminate or alkaline earth metal titanate from the anhydrous alkaline earth metal nitrate and the aluminum oxide or titanium dioxide present in or formed by the first heating step, the proportions of the constituents in the mixture being such that the final porous, refractory bodies do not contain free aluminium oxide or free titanium dioxide.

2. Process as claimed in claim 1 in which the alkaline earth metals are selected from the group consisting of calcium, barium, strontium and magnesium.

3. Process as claimed in claim 1 in which the first temperature is within the range of from 250° C. to 300° C.

4. Process as claimed in claim 1 in which the second temperature is within the range of from 680° to 750° C.

5. Process for making porous, shaped refractory bodies consisting essentially of alkaline earth metal aluminate or alkaline earth metal titanate comprising the steps of making a mixture in approximately 1:1 molar ratio of a compound selected from the group consisting of aluminium oxide, aluminium hydroxide and titanium dioxide, and an anhydrous alkaline earth metal nitrate in comminute form of at least 65 mesh British Standard Sieve, which acts as a binding agent for the resulting mixture, shaping the mixture into bodies and heating the shaped bodies at a temperature within the range of from 650° C. to 950° C. for a period of time sufficient to complete the formation of alkaline earth metal aluminate or titanate from the anhydrous alkaline earth metal nitrate and the compound selected from aluminium oxide, aluminium hydroxide and titanium dioxide, the proportions in the mixture being such that the final porous, refractory bodies do not contain free aluminium oxide or free titanium dioxide.

6. Process as claimed in claim 5 in which the alkaline earth metals are selected from the group consisting of calcium, barium, strontium and magnesium.

7. Process as claimed in claim 5 in which the temperature is within the range of from 680° to 750° C.

References Cited

UNITED STATES PATENTS

| | | | |
|---|---|---|---|
| 3,397,154 | 8/1968 | Talsma | 252—463 |
| 3,141,729 | 7/1964 | Clark et al. | 252—475 X |
| 2,921,033 | 1/1960 | Houdry | 252—475 X |
| 3,444,256 | 5/1969 | Engelhard et al. | 252—463 X |
| 3,444,257 | 5/1969 | Engelhard et al. | 252—463 X |
| 2,763,696 | 9/1956 | Finch et al. | 252—475 X |
| 3,173,883 | 3/1965 | Cornelius et al. | 252—463 X |
| 2,523,686 | 9/1950 | Engel | 252—438 X |
| 3,163,612 | 12/1964 | Meisinger et al. | 252—438 |
| 3,288,722 | 11/1966 | Gleim | 252—438 |
| 2,517,223 | 8/1950 | Mantell | 252—438 |
| 3,294,707 | 12/1966 | Pollitzer et al. | 252—438 |
| 3,148,157 | 9/1964 | Pollitzer et al. | 252—438 |
| 3,387,038 | 6/1968 | Koch | 252—438 X |

LORENZO B. HAYES, Primary Examiner

D. A. JACKSON, Assistant Examiner

U.S. Cl. X.R.

252—463, 475; 264—66